C. L. CUMMINS.
STUFFING BOX.
APPLICATION FILED MAR. 4, 1915. RENEWED JUNE 26, 1916.
1,194,146.
Patented Aug. 8, 1916.
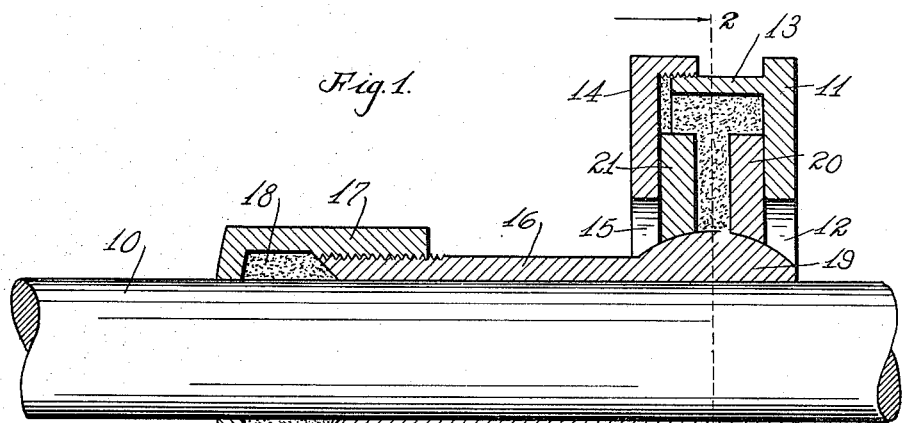
Fig. 1.
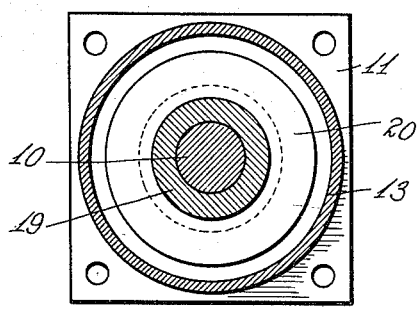
Fig. 2.
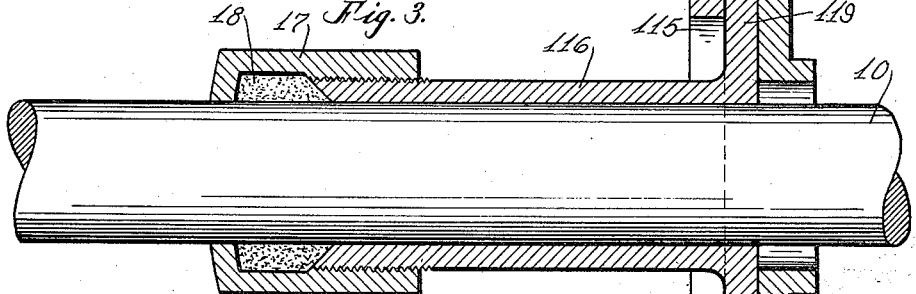
Fig. 3.
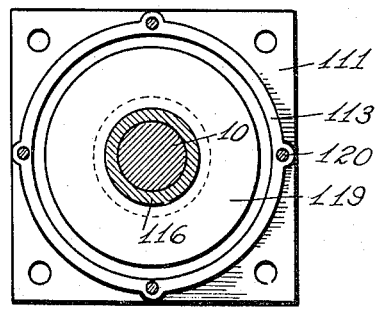
Fig. 4.
WITNESSES:
A H Edgerton
R G Lockwood
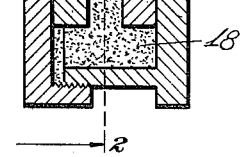
INVENTOR
Clessie L Cummins
BY
T H Lockwood
ATTORNEY

UNITED STATES PATENT OFFICE.

CLESSIE LYLE CUMMINS, OF COLUMBUS, INDIANA.

STUFFING-BOX.

1,194,146.  Specification of Letters Patent.  Patented Aug. 8, 1916.

Application filed March 4, 1915, Serial No. 12,215. Renewed June 26, 1916. Serial No. 106,057.

*To all whom it may concern:*

Be it known that I, CLESSIE LYLE CUMMINS, a citizen of the United States, and a resident of Columbus, county of Bartholomew, and State of Indiana, have invented a certain new and useful Stuffing-Box; and I do hereby declare that the following is a full, clear, and exact description thereof, reference being had to the accompanying drawings, in which like letters refer to like parts.

The object of this invention is to provide a stuffing box for launches or the like and any other vessel requiring a driving shaft which extends into the water.

It has been found in using the ordinary stuffing box that if the wooden portion of the vessel becomes warped, even to a very small degree, it will throw the stuffing box out of alinement with the engine, to which the driving shaft is connected, thereby slightly curving or bending the shaft out of its proper line. This causes the metal to crystallize from the constant rotation of the shaft in this curved position, thereby weakening the shaft and oftentimes breaking it.

The feature of this invention is to produce a stuffing box which may vary in its position with respect to any warping that may be caused by the effect of the water on the wood of the vessel and retain its alinement with the shaft and the engine. The effect of this stuffing box is to keep the shaft in its proper alinement with the engine, thereby preventing it from crystallizing so as to be easily broken.

The full nature of the invention will be understood from the accompanying drawings and the following description and claims.

Figure 1 is a vertical cross section through a stuffing box with the shaft in elevation. Fig. 2 is a cross section on line 2—2 of Fig. 1. Fig. 3 is a vertical cross section of a stuffing box with the shaft in elevation, showing a modified form thereof. Fig. 4 is a cross section on line 4—4 of Fig. 3.

In the drawings there is a driving shaft 10, extending through the stuffing box connected with the motor, not shown herein, on one end and driven thereby, and on the other end connected to the propeller or the driven member, not shown. There is a plate 11 which is secured to the bottom portion of the vessel, which has an annular opening 12 through which the driving shaft may pass and of considerably larger diameter than said shaft. There is a circular flange portion 13 extending at right angles to said plate and integral therewith, on which is screwed a cap 14, thereby forming a stuffing box; said cap having an annular opening 15 of the same diameter as the opening 12. A bearing 16 extends around said driving shaft and has a housing 17 screwed on the opposite end thereof from said plates 11 and 14, which is partially hollow and contains grease or like substance 18, which may be pressed tightly around said shaft by tightening said housing on said bearing so that no water may pass therethrough. This bearing and housing containing grease or the like is of the ordinary type of stuffing box. On the other end said bearing has an enlarged portion 19 which fits snugly against a plate 20 on the inner side of said plate 11 and having an annular opening of such diameter and shape as to snugly fit said enlargement 19. On the other side of said enlargement is a similar plate 21 with an annular opening of the same size and of converse shape to that of plate 20 for resting snugly against the other side of said enlargement, as shown in Fig. 1. Said plate 21 is held tightly in place by the screw plate or cap 14. Intermediate of said plates there is grease 18 for preventing water from passing between said plates and the enlarged portion 19. By this device, when the plate 11 attached to the wooden portion of the vessel is thrown out of alinement by the warping of said vessel, the enlarged portion 19 of the bearing will be allowed to turn to a limited extent in any direction because of its spherical shape, and also the plates 20 and 21 will be permitted to move in their plane to such an extent as to adjust the driving shaft to its proper alinement with the engine. At the same time the grease 18 will prevent water from passing through into the vessel. As the enlargement 19 becomes worn or leaks in any way the cap 14 may readily be screwed tighter, thereby pressing the plate 21 more firmly against such enlargement.

In the modified view shown in Fig. 3 there is a plate 111 surrounding said shaft 10 having an opening through which said shaft passes, of a larger diameter than said shaft, and having an extension 113 extending inwardly and at right angles thereto and secured to a plate 114 by screws 120. Said plate 114 has an opening 115 of a considerably larger diameter than said shaft. Screwed to said housing 17 there is a bearing 116 surrounding said shaft. Rigidly secured to said bearing there is a plate 119. Said plate is of slightly larger diameter than the opening 115 and is held against the plate 111 by the plate 114 in such a manner that it is movable radially to said shaft, but held in position by said plates. Surrounding the outer edges of said plate there is grease 18 for preventing water from entering said vessel. By this means, when the vessel becomes warped and the plate is thrown out of proper position, the plate on the bearing may adjust itself relative to said plate so that said driving shaft may always be maintained in proper alinement to the engine.

The invention claimed is:

1. The combination of a shaft, a fixed stuffing box, a bearing member surrounding the shaft, and a member extending from the said bearing member into the stuffing box, one of said members being movable in a plane substantially transversely of the shaft.

2. The combination of a shaft, a fixed stuffing box, a bearing member surrounding the shaft, and a member extending from said bearing member into the stuffing box and movable therein.

3. The combination of a shaft, a bearing member surrounding the shaft, a fixed stuffing box with an opening through it for said bearing member which is appreciably greater in diameter than said bearing member, and a plate extending from said bearing member into the stuffing box and movable therein.

4. The combination with a shaft, a bearing member surrounding the shaft, a fixed stuffing box with an opening through it for said bearing member of greater diameter than the bearing member and there being a chamber in said bearing member, and a plate extending from said bearing member into said chamber of the stuffing box and movable therein in a plane transversely of the shaft.

5. The combination with a shaft, a bearing member surrounding the shaft, a fixed stuffing box with an opening through it for said bearing member of greater diameter than the bearing member and there being a chamber in said bearing member, grease filling said chamber, and a plate extending from said bearing member into said chamber of the stuffing box and movable therein in a plane transversely of the shaft.

6. The combination of a shaft, a fixed stuffing box, a bearing surrounding the shaft, and a member extending from said bearing member into the stuffing box and movable therein, one of said members having a spherical portion embraced by the other member so as to make a substantially close joint between them.

7. The combination of a shaft, a fixed stuffing box, a bearing surrounding the shaft, a member extending from said bearing member into the stuffing box and movable therein, one of said members having a spherical portion embraced by the other member, and means for tightening said members to make the joint between them substantially close.

8. The combination of a shaft, a bearing member with a spherical portion, a fixed stuffing box with an opening therein surrounding the spherical portion of said bearing member and with an opening of greater diameter than the bearing member, and a plate embracing the spherical portion of said bearing member and extending into said stuffing box.

9. The combination of a shaft, a bearing member with a spherical portion, a fixed stuffing box with an opening therein surrounding the spherical portion of said bearing member and with an opening of greater diameter than the bearing member, a plate embracing the spherical portion of said bearing member and extending into said stuffing box, and means for tightening the joint between said plate and the spherical portion of said bearing member.

10. The combination of a shaft, a bearing member surrounding the shaft with a spherical portion, a fixed stuffing box with an opening therein surrounding the spherical portion of said bearing member and having a chamber in it, grease filling the chamber in the stuffing box, a plate embracing the spherical portion of said bearing member and extending into the grease chamber of the stuffing box, and means for tightening the joint between said plate and the spherical portion of said bearing member.

11. The combination of a shaft, a bearing member surrounding the shaft with a spherical portion, a fixed stuffing box with an opening therein surrounding the spherical portion of said bearing member and having a chamber in it, grease filling said chamber in the stuffing box, a pair of plates embracing opposite sides of said spherical portion of the bearing member and extending into said grease chamber of the stuffing box, and means for forcing said plates toward each other making a tight joint between them and the spherical portion of the bearing member.

12. The combination of a shaft, a bearing member surrounding the shaft with a spherical portion, a fixed stuffing box member surrounding said spherical portion of the bearing member, a follower adapted to screw on the fixed stuffing box member, and form a chamber between them, grease filling said chamber, and a pair of plates surrounding and embracing opposite sides of the spherical portion of the bearing member and extending into said grease chamber in position to be tightened on the spherical portion of the bearing member by tightening the follower of the stuffing box.

In witness whereof, I have hereunto affixed my signature in the presence of the witnesses herein named.

CLESSIE LYLE CUMMINS.

Witnesses:
WEB H. WELLER,
J. S. HUVERKURT.